United States Patent
Adams et al.

(10) Patent No.: US 9,378,346 B2
(45) Date of Patent: Jun. 28, 2016

(54) OPTIMIZED BIOMETRIC AUTHENTICATION METHOD AND SYSTEM

(75) Inventors: Neil Patrick Adams, Waterloo (CA); Herbert A. Little, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1580 days.

(21) Appl. No.: 12/019,625

(22) Filed: Jan. 24, 2008

(65) Prior Publication Data

US 2009/0193151 A1    Jul. 30, 2009

(51) Int. Cl.
*G06F 3/00* (2006.01)
*G06F 21/32* (2013.01)

(52) U.S. Cl.
CPC ..................... *G06F 21/32* (2013.01)

(58) Field of Classification Search
None
See application file for complete search history.

(56) References Cited

U.S. PATENT DOCUMENTS

| | | | |
|---|---|---|---|
| 6,377,699 B1 * | 4/2002 | Musgrave | A01K 11/006 340/5.82 |
| 6,571,245 B2 | 5/2003 | Huang et al. | |
| 6,748,538 B1 | 6/2004 | Chan et al. | |
| 6,819,219 B1 | 11/2004 | Bolle et al. | |
| 6,839,756 B1 * | 1/2005 | Boudou et al. | 709/225 |
| 6,850,147 B2 | 2/2005 | Prokoski et al. | |
| 6,862,659 B1 * | 3/2005 | Mason et al. | 711/113 |
| 7,127,577 B2 * | 10/2006 | Koning et al. | 711/162 |
| 7,303,120 B2 * | 12/2007 | Beenau | G01D 21/00 235/380 |
| 7,322,040 B1 * | 1/2008 | Olson et al. | 726/8 |
| 7,461,266 B2 * | 12/2008 | Chou | G06F 12/1433 382/115 |
| 2001/0034836 A1 * | 10/2001 | Matsumoto | G06F 21/32 713/176 |
| 2002/0067428 A1 * | 6/2002 | Thomsen | 348/465 |
| 2002/0162021 A1 * | 10/2002 | Audebert et al. | 713/201 |
| 2002/0174346 A1 * | 11/2002 | Ting | G06F 21/32 713/186 |
| 2002/0176611 A1 * | 11/2002 | Dong | G06F 21/32 382/124 |
| 2002/0188855 A1 * | 12/2002 | Nakayama | G06F 21/32 713/186 |
| 2003/0048173 A1 * | 3/2003 | Shigematsu | G06F 21/32 340/5.52 |
| 2004/0014374 A1 | 1/2004 | Maeda et al. | |
| 2004/0148526 A1 * | 7/2004 | Sands et al. | 713/202 |
| 2004/0268246 A1 * | 12/2004 | Leban et al. | 715/516 |
| 2006/0080525 A1 * | 4/2006 | Ritter | G06F 21/32 713/155 |
| 2006/0080548 A1 * | 4/2006 | Okamura | G06F 21/32 713/186 |
| 2006/0080549 A1 | 4/2006 | Okamura et al. | |
| 2006/0225126 A1 | 10/2006 | Brown et al. | |
| 2006/0253650 A1 * | 11/2006 | Forrer et al. | 711/113 |

(Continued)

FOREIGN PATENT DOCUMENTS

EP    1710948    10/2006

OTHER PUBLICATIONS opensdp.org ("IsoSecureChannel—Reference Documentation" found at www.openscdp.org/schsh3/isosecurechannel.html, Jul. 2007).*

(Continued)

*Primary Examiner* — Peter Poltorak
(74) *Attorney, Agent, or Firm* — Ridout & Maybee LLP

(57) ABSTRACT

An efficient exchange of messages in a system for authenticating access to a base device is facilitated through the selection of a particular biometric template from among a plurality of biometric templates. Rather than transmitting the template to a peripheral device, an indication of a location of the particular biometric template within the plurality of biometric templates is transmitted to the peripheral device. At the peripheral device, once the indication of the location and a biometric candidate are received, the particular biometric template may be located and compared to the biometric candidate. Finally, an indication of a result of the comparing may be transmitted to the base device.

18 Claims, 8 Drawing Sheets

(56) References Cited

U.S. PATENT DOCUMENTS

| | | | | |
|---|---|---|---|---|
| 2007/0101128 A1* | 5/2007 | Kamoi | ............... | G06F 21/32 713/159 |
| 2007/0288998 A1 | 12/2007 | Gudigara et al. | | |
| 2008/0040388 A1* | 2/2008 | Petri et al. | ............... | 707/104.1 |
| 2009/0271635 A1* | 10/2009 | Liu | ............... | G06F 21/32 713/186 |
| 2010/0049987 A1* | 2/2010 | Ettorre | ............... | G06F 21/32 713/186 |
| 2011/0145904 A1* | 6/2011 | Pizano | ............... | G06F 21/32 726/7 |

OTHER PUBLICATIONS

PCT International Search Report, regarding International Application No. PCT/CA2009/000061, dated May 7, 2009.

Extended European Search Report issued Jul. 28, 2008 in connection with corresponding European patent application No. 08150627.1.

Examiner's Report, Nov. 15, 2013, Canadian Patent Application No. 2,712,525.

Examiner's Report, Dec. 11, 2013, U.S. Appl. No. 12/019,618.

* cited by examiner

OPTIMIZED BIOMETRIC AUTHENTICATION METHOD AND SYSTEM

CROSS REFERENCE TO RELATED APPLICATIONS

The present application is related to commonly-owned U.S. patent application Ser. No. 12/019,618 entitled "Optimized Biometric Authentication Method and System". The contents of the referenced application are incorporated herein.

FIELD OF THE INVENTION

The present application relates generally to authentication and, more specifically, to a method and system of optimized biometric authentication.

BACKGROUND OF THE INVENTION

The mobile device market is currently experiencing explosive growth as mobile devices evolve to deliver increasingly critical services such as organizational planning, wireless telephone, e-mail, Internet browsing and services related to the critical services. Mobile devices are increasingly becoming critical tools to professionals and employees at all levels and in all positions. Government employees, researchers, law enforcement, national security and intelligence officers, and military personnel rely heavily on technology to perform their jobs. However, people in these roles must be able to rely on their mobile devices to provide a secure system of information storage that is not susceptible to intrusion by outsiders or unauthorized users. Biometric authentication is often considered for providing security to mobile devices in use by people in such roles.

Biometric authentication relates to automatically and uniquely recognizing humans based upon one or more intrinsic physical or behavioral traits. Biometric authentication often involves technologies that measure and analyze human physical and behavioral characteristics. Examples of physical characteristics include fingerprints, retinas, irises, facial patterns and hand measurements, while examples of mostly behavioral characteristics include signature, gait and typing patterns. Voice is considered a mix of both physical and behavioral characteristics.

Unfortunately, current implementations of biometric identity verification for mobile devices are tedious and slow. Accordingly, efficiency improvements are desirable in the art of biometric identity verification. Such improvements may even be applicable to mobile devices.

BRIEF DESCRIPTION OF THE DRAWINGS

Reference will now be made to the drawings, which show by way of example, embodiments of the invention, and in which.

DETAILED DESCRIPTION OF THE EMBODIMENTS

Figure 1:
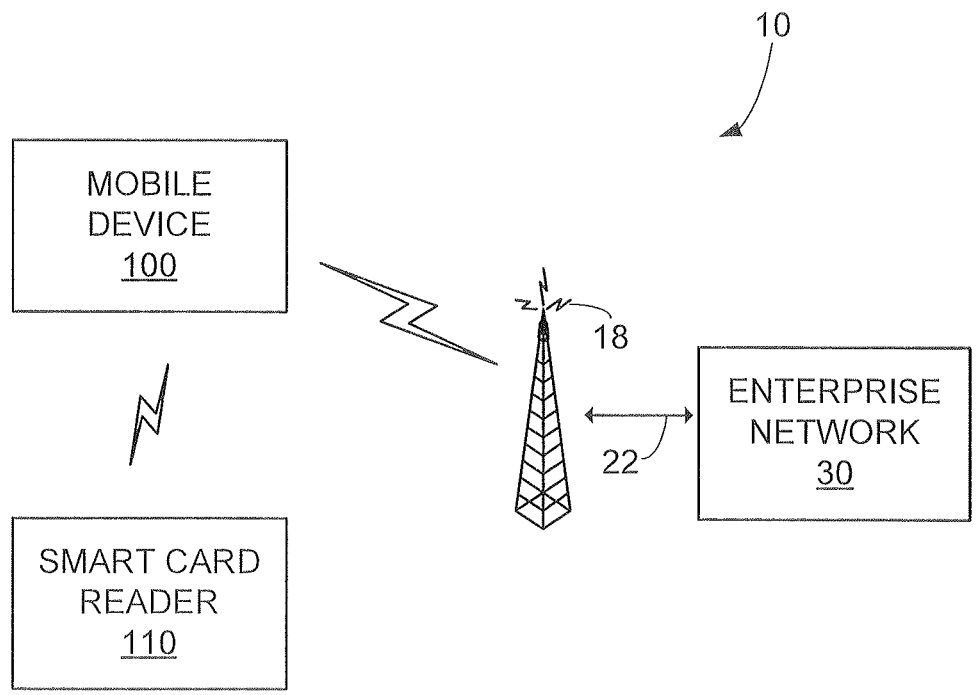
FIG. 1 shows, in block diagram form, a communication system suitable for use by a computing apparatus in accordance with one embodiment.

An efficient exchange of messages in a system for authenticating access to a base device is facilitated through the selection of a particular biometric template from among a plurality of biometric templates. Rather than transmitting the template to a peripheral device, an indication of a location of the particular biometric template within the plurality of biometric templates is transmitted to the peripheral device. At the peripheral device, once the indication of the location and a biometric candidate are received, the particular biometric template may be located and compared to the biometric candidate. Finally, an indication of a result of the comparing may be transmitted to the base device.

In accordance with an aspect of the present application there is provided a method of facilitating, at a base device, an efficient exchange of messages in a system for authenticating access to the base device, the authenticating based on a data set comprising a plurality of biometric templates. The method includes transmitting a command message to a peripheral device for forwarding to a memory device physically connected to the peripheral device, the command message requesting the data set, the command message including an instruction to the peripheral device to maintain a copy of data received in a response message from the memory device. In other aspects of the present application, a computing apparatus is provided for carrying out this method and a computer readable medium is provided for adapting a processor to carry out this method.

In accordance with a further aspect of the present application there is provided a method of facilitating, at a peripheral device, an efficient exchange of messages in a system for authenticating access to a base device, the authenticating based on a data set comprising a plurality of biometric templates. The method includes receiving, from the base device, a command message for forwarding to a memory device physically connected to the peripheral device, the command message requesting the data set, extracting an instruction from the command message, forwarding the command message to the memory device and receiving a response message from the memory device. The method further includes, according to the instruction: extracting a copy of data received in the response message; and storing the copy of the data. In other aspects of the present application, a computing apparatus is provided for carrying out this method and a computer readable medium is provided for adapting a processor to carry out this method.

Other aspects and features of the present application will become apparent to those of ordinary skill in the art upon review of the following description of specific embodiments of the application in conjunction with the accompanying figures.

In information technology, biometric authentication refers to technologies that measure and analyze human physical and behavioral characteristics for authentication purposes. Examples of physical characteristics include fingerprints, handprints, eye retinas and irises, facial patterns and hand measurements, while examples of mostly behavioral characteristics include signature, gait and typing patterns. Voice is considered a mix of both physical and behavioural characteristics. However, it can be argued that all biometric traits share physical and behavioral aspects.

The use of a biometric authentication system begins with the collection and storage of template biometrics from potential users of the biometric authentication system. At the time of desired authentication, the user inputs, to a device (or to a peripheral to the device), a "candidate" biometric. Matching algorithms are then used to compare previously stored template biometrics against the candidate biometric. In the case where the biometric is an image, an original image (template) may be directly compared with a candidate image. Alternatively, formation of the template involves identifying certain features of an original image. Once the features are identified, the template may be formed of location and orientation information for each of the features. Similarly, a candidate is formed by identifying certain features of a candidate image and, subsequently, the template is compared to the candidate.

In one application, biometric authentication may be used for authenticating the user of a mobile communication device.

FIG. 1 illustrates an exemplary communication system 10 that includes a mobile device 100 that is enabled to communicate with a wireless network 18. The mobile device 100 is illustrated as communicating wirelessly with a peripheral device in the form of a smart card reader 110.

Notably, while only one mobile device 100 and only one wireless network 18 are shown in FIG. 1, it should be clear to a person of ordinary skill in the art that many such mobile devices 100 and wireless networks 18 may be present in further exemplary communication systems. The wireless network 18 may be implemented as a packet-based cellular network that includes a number of base stations each providing wireless Radio Frequency (RF) coverage to a corresponding area or cell. For example, the wireless network 18 could conform to one or more of the following, among other network standards: Mobitex Radio Network; DataTAC; Global System for Mobile Communication (GSM); General Packet Radio System (GPRS); Time Division Multiple Access (TDMA); Code Division Multiple Access (CDMA); Cellular Digital Packet Data (CDPD); integrated Digital Enhanced Network (iDEN); or various other third generation networks such as Enhanced Data rates for GSM Evolution (EDGE), Universal Mobile Telecommunications Systems (UMTS), Wideband Code Division Multiple Access (W-CDMA), High Speed Packet Access (HSPA), etc. Other types of data and voice networks, both separate and integrated, may also be utilized with the mobile device 100.

In some embodiments, instead of, or in addition to, a wireless wide area network, the wireless network 18 may include a wireless local area network, such as, for example, a wireless local area network that conforms to one or more IEEE 802.11 standards, such as 802.11b, 802.11g and 802.11n. In at least some example embodiments, the wireless network 18 is connected, through intermediate communications links 22, including, for example, links through the Internet, to one or more enterprise networks 30. Typically, such enterprise networks 30 are each associated with a set of respective mobile devices 100, such that the mobile devices 100 are each enabled to exchange electronic messages and other information with the enterprise networks 30 with which the mobile devices 100 are associated.

Figure 2:
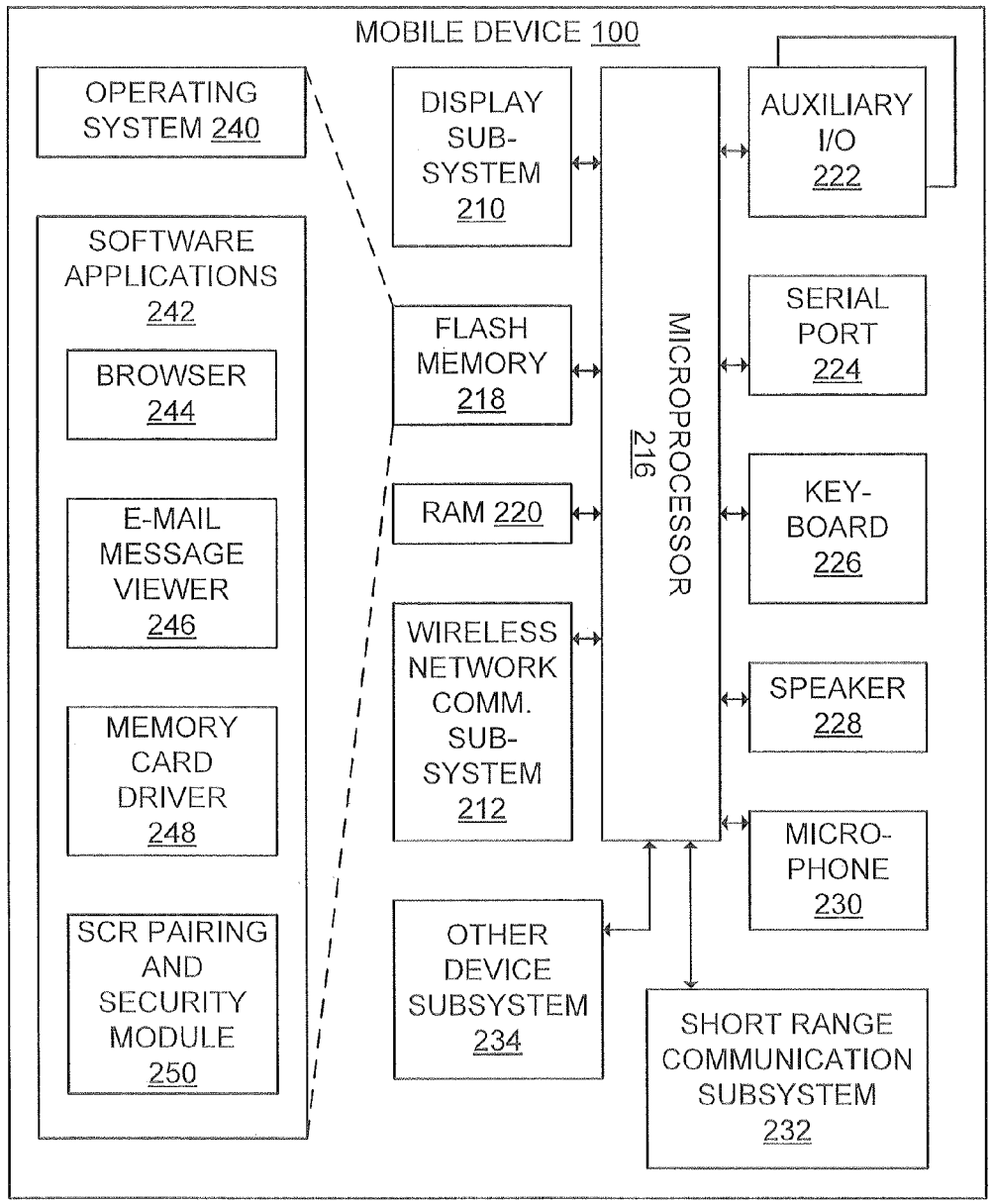
FIG. 2 shows, in diagrammatic form, a mobile device according to one embodiment.

FIG. 2 illustrates a detailed embodiment of the mobile device 100. The mobile device 100 includes a display subsystem 210 and a wireless network communication subsystem 212 for two-way communications with the wireless network 18 (FIG. 1). According to one embodiment, the communications subsystem 212 includes antennas (not shown), RF transceivers (not shown) and some signal processing capabilities that may be implemented, for example, by a digital signal processor (not shown). The mobile device 100 also includes a controller in the form of at least one mobile device microprocessor 216 that is suitably programmed to control the overall operation and functions of the mobile device 100, which are described in more detail below. The mobile device 100 includes peripheral devices or subsystems such as a flash memory 218, a random access memory (RAM) 220, an auxiliary input/output (I/O) subsystem 222 (e.g., a scroll wheel, a touchpad, a rocker switch, a thumb-wheel, a trackball, a touchscreen), a serial port 224 (e.g., a Universal Serial Bus, or "USB", port), an input device 226 (e.g., a keyboard or keypad), a speaker 228, a microphone 230, a mobile device short-range communications subsystem 232 (e.g., an infrared transceiver, wireless bus protocol system, such as a Bluetooth™ or other means of local wireless communications) and an other device subsystem designated generally by reference 234.

The mobile device microprocessor 216 operates under stored program control with code or firmware being stored in the flash memory 218 (or other type of non-volatile memory device or devices). As depicted in FIG. 2, the flash memory 218 includes stored programs (e.g., firmware) including an operating system program or code module 240 and other programs or software applications indicated generally by reference 242. The software applications 242 can, for example, include a World Wide Web (WWW) browsing application 244 and an e-mail client application 246.

According to example embodiments, the software applications 242 of the mobile device 100 further include a memory card driver 248 that may be used in conjunction with the smart card reader 110, which is described in more detail below in connection with FIG. 3. Notably, the memory card driver 248 may be provided, not by the manufacturer of the mobile device 100, but, instead, by a third party, i.e., the manufacturer of the memory card 334. Furthermore, an Application Programming Interface (API) may be built in to the memory card driver 248 to allow the mobile device 100 to communicate with the memory card 334 through the smart card reader 110.

The software applications 242 of the mobile device 100 may further include a smart card reader pairing and security module 250 for coordinating a pairing process between the mobile device 100 and the smart card reader 110. The roles of the memory card driver 248 and the smart card reader pairing and security module 250 will be described in greater detail below. The operating system code 240, code for specific device applications 242, code for the WWW browsing application 244, code for the e-mail client application 246, code for the memory card driver 248, or code for the smart card reader pairing and security module 250 may be temporarily loaded into a volatile storage medium such as the RAM 220 during operation of the mobile device 100. Received communication signals and other data with information may also be stored in the RAM 220. In some embodiments, the mobile device 100 may include, in addition to the internal flash memory 218, persistent memory carried on a SIM (Subscriber Identity Module) card, or other removable device, and at least some of the flash memory 218 may be allocated to the SIM card flash memory.

The stored program control (i.e., the software applications 242) for the mobile device microprocessor 216 also includes a predetermined set of applications, code components or software modules that control basic device operations, for example, data and voice communication applications which are normally installed on the mobile device 100 as the software applications 242 during the manufacturing process. Further applications may also be loaded (i.e., downloaded) onto the mobile device 100 through the operation of networks described above, the auxiliary I/O subsystem 222, the serial port 224 or the mobile device short-range communications subsystem 232. The downloaded code modules or components are then installed by the user (or automatically) in the RAM 220 or the non-volatile program memory (e.g., the flash memory 218).

The serial port 224 may comprise a USB-type interface port for interfacing or synchronizing with another device, such as a desktop or notebook computer (not shown). The serial port 224 may be used to set preferences through an external device or software application. The serial port 224 may also be used to extend the capabilities of the mobile device 100 by providing for information or software downloads, including user interface information, to the mobile device 100 other than through a wireless communication network. In one embodiment, the serial port 224 may be used to communicate with a smart card reader 110.

The mobile device short-range communications subsystem 232 provides an interface for communication between the mobile device 100 and other devices, including the smart card reader 110, to be described in greater detail in connection with FIG. 3, below. For example, the mobile device short-range communications subsystem 232 may employ an infrared communication link or channel, or may operate according to a wireless bus protocol, such as Bluetooth™, or any other localized wireless means of communication.

Figure 3:
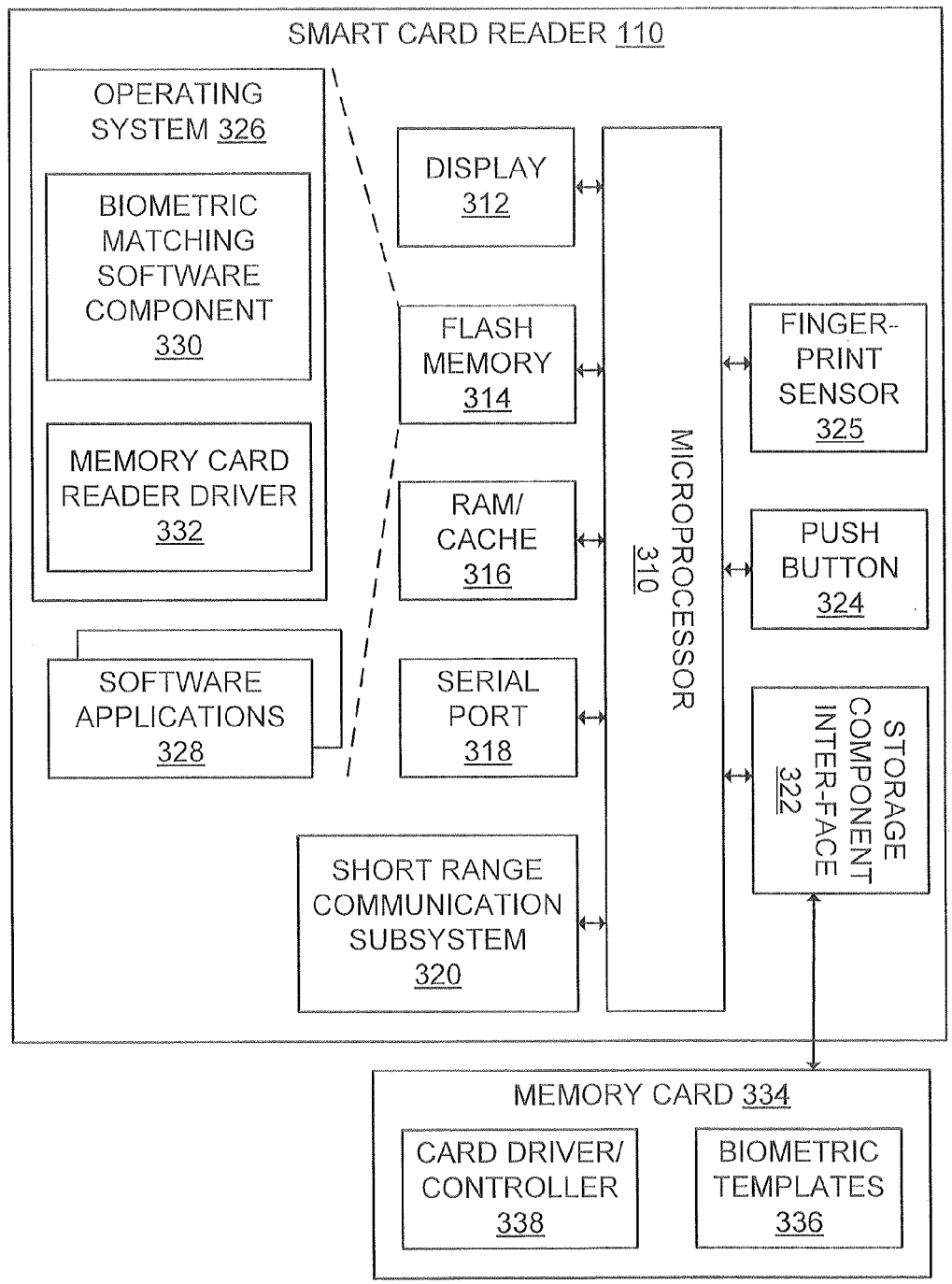
FIG. 3 shows, in diagrammatic form, one embodiment of a smart card reader, and memory card, for use with the mobile device shown in FIG. 2.

FIG. 3 illustrates an example embodiment of the smart card reader 110. The smart card reader 110 includes a controller including at least one smart card reader microprocessor 310, which is suitably programmed to control the overall operation and functions of the smart card reader 110. The smart card reader 110 also includes an output device 312 (e.g., a display module). The smart card reader 110 further includes peripheral devices or subsystems such as a flash memory 314, a random access memory (RAM) 316, which, in some embodiments, includes a portion allocated to a data cache, a serial port 318 (e.g., a USB port), a smart card reader short-range communications subsystem 320 (e.g., an infrared transceiver, wireless bus protocol system using a protocol such as a Bluetooth™), a storage component interface 322 (e.g., for a memory card or any other data storage device), a pairing-activation input device 324 (e.g., a push button) and a biometric input device 325 (e.g., a fingerprint sensor).

A fingerprint sensor comprises an electronic device used to capture a digital image of a fingerprint pattern. The captured image is called a live scan. This live scan may be digitally processed to create a biometric template, which is stored and used for later matching. Some of the more commonly used fingerprint sensor technologies include: optical; ultrasonic; and capacitance.

The smart card reader microprocessor 310 operates under stored program control with code or firmware being stored in the flash memory 314 (or other type of non-volatile memory device or devices). As depicted in FIG. 3, the stored programs (e.g., firmware) include an operating system program or code module 326 and other programs or software applications indicated generally by reference 328. The operating system 326 of the smart card reader 110 further includes a biometric matching software component 330 and a memory card reader driver component 332.

The biometric matching software component 330 is used to analyze or compare candidate biometrics scanned by the biometric input device 325 in reference to stored biometric templates.

The memory card reader driver component 332 is responsible for coordinating communications between the smart card reader 110 and a memory card 334 and/or the memory card driver 248 of the mobile device 100.

The operating system code 326, code for specific device applications 328, code for the biometric matching software component 330, code for the memory card reader driver component 332, or code components thereof, may be temporarily loaded into a volatile storage medium such as the RAM 316. Received communication signals and other data may also be stored in the RAM 316. Additionally, the storage component interface 322 receives the removable memory card 334, providing additional storage space for the smart card reader 110. In one embodiment, the memory card 334 may be a smart card conforming to ISO 7816 "Identification cards—Integrated circuit(s) cards with contacts", which is available from the International Organization for Standardization at www.iso.ch. In one embodiment, the memory card 334 stores biometric templates 336 and has a card driver and controller 338 responsible for coordinating communications between the memory card 334 and the memory card reader driver component 332 of the smart card reader 110. While operation of the smart card reader 110 is described in a context wherein the memory card 334 is a smart card, it will be understood by those skilled in the art that the smart card reader 110 may be designed to operate with any suitable form of memory device.

The stored program control (i.e., software applications 328) for the smart card reader microprocessor 310 may include a predetermined set of applications, code components or software modules that control basic device operations, for example, management and security related control of the data of the smart card reader 110, and may be installed on the smart card reader 110 as a component of the software applications 328 during the manufacturing process. Further applications may also be loaded (i.e., downloaded) onto the smart card reader 110 through the operation of the serial port 318, the smart card reader short-range communications subsystem 320 or from the memory card 334. The downloaded code module or components are then installed by the user (or automatically) in the RAM 316 or non-volatile program memory (e.g., the flash memory 314).

While the biometric matching software component 330 and the memory card reader driver component 332 are shown to be an integrated portion of the operating system 326 for security purposes (e.g., individuals must not be permitted to tamper with the biometric matching software component 330 or the memory card reader driver component 332), the biometric matching software component 330 and/or the memory card reader driver component 332 could be installed as one of the software applications 328 so long as suitable security related precautions are taken to ensure that the biometric matching software component 330 and the memory card reader driver component 332 cannot be modified or tampered with by unauthorized users.

The serial port 318 may be a USB-type interface port for interfacing or synchronizing with another device, such as a desktop computer (not shown) or the mobile device 100. The serial port 318 is used to set preferences through an external device or software application or exchange data with a device, such as the mobile device 100, which data is stored on the memory card 334 that is plugged into the storage component interface 322 of the smart card reader 110. The serial port 318 is also used to extend the capabilities of the smart card reader 110 by providing for downloads, to the smart card reader 110, of information or software, including user interface information.

The smart card reader short-range communications subsystem 320 provides an interface for communication between the mobile device 100 and the smart card reader 110. In one embodiment, the smart card reader short-range communications subsystem 320 employs an infrared communication link or channel. In another embodiment, the smart card reader short-range communications subsystem 320 operates according to a wireless RF bus protocol, such as Bluetooth™. However, the smart card reader short-range communications subsystem 320 may operate according to any suitable local wired or wireless communication protocol, so long as the short-range communications subsystem 232 of the mobile device 100 (FIG. 2) operates using the same protocol, thereby facilitating wireless communication between the mobile device 100 and the smart card reader 110. Any communications mechanism and/or protocol may be implemented for the short-range communications subsystems 232, 320, so long as the mobile device 100 and the smart card reader 110 can communicate with each other when within physical proximity.

In some enhanced security embodiments, in order for a user to use some or all of the functionality of the mobile device 100, the mobile device 100 must be in at least periodic communication with its associated smart card reader 110 through the mobile device short-range communications system 232 to receive authorization information stored on the memory card 334. The authorization information stored on the memory card 334 will typically include unique authentication information for a designated user of the mobile device 100, such as the biometric templates 336 and/or further authentication information such as passwords, etc. Such a configuration mitigates against unauthorized use when the mobile device 100 becomes separated (i.e., out of communications range) from the smart card reader 110 with which the mobile device 100 has been paired. According to example embodiments, in addition to providing enhanced security functionality, the smart card reader 110 is also used to backup data from the mobile device 100.

The memory card driver 248 provides information to the mobile device 100 on how to communicate with the memory card 334. The smart card reader 110 typically only has code on it associated with the retailer or manufacturer of the smart card reader 110 and the memory card driver 248 is a vendor-specific driver normally written by a third party associated with the memory card 334.

It is not necessarily typical that the biometric input device 325 be located on the smart card reader 110. Indeed, a peripheral biometric input device (not shown) may be associated with the mobile device 100. Accordingly, biometric authentication can be controlled and processed on the mobile device 100. In such a case, the mobile device 100 first obtains the fingerprint templates 336 from their storage on the memory card 334. At a later time, the mobile device 100 prompts a user for biometric input via the peripheral biometric input device. Upon receiving a candidate biometric, the mobile device microprocessor 216 compares the candidate biometric to a biometric template selected from among the fingerprint templates 336 obtained from the memory card 334. On the basis of the result of the comparison, the mobile device microprocessor 216 may allow the user access to various applications executed on the mobile device 100.

Communication between the mobile device 100 and the smart card reader 110 and between the smart card reader 110 and the memory card 334 may be standardized to use Application Protocol Data Units (APDUs), where a standard structure for an APDU is defined by ISO 7816. There are two categories of APDUs: command APDUs; and response APDUs. A command APDU is sent, for instance, by the smart card reader 110 to the memory card 334. A command APDU contains a header and may contain data. A response APDU is sent by the memory card 334 to the smart card reader 110. A response APDU contains a status word and may contain data.

When the biometric input device 325 is located on the smart card reader 110, as illustrated in FIG. 3, the biometric matching software component 330 may also be located on the smart card reader 110. However, to perform authentication, the biometric matching software component 330 needs a biometric template that is stored on both the memory card 334 and the mobile device 100.

In overview, it is proposed herein to add an extension to the memory card API that is used by the memory card driver 248 at the mobile device 100. Such an extension would allow the memory card driver 248 to specify, to the memory card reader driver component 332 of the smart card reader 110, that the data contained in the an expected response APDU from the memory card 334 contains fingerprint (biometric) templates 336. Accordingly, responsive to receiving the expected response APDU, the microprocessor 310 of the smart card reader 110 can extract the fingerprint templates 336 from the response APDU and store the fingerprint templates 336, for example, in the RAM/cache 316. Additionally, the memory card reader driver component 332 may be provided with an ability to read the stored fingerprint templates 336.

At the time of authentication, the mobile device microprocessor 216 determines a location for a template in the fingerprint templates 336. The mobile device microprocessor 216 then transmits an indication of the location to the smart card reader 110. Upon receiving the location indication, the memory card reader driver component 332 may extract the required fingerprint template from the fingerprint templates 336 extracted earlier from the template response APDU 504 and saved. When a candidate fingerprint has been obtained, the biometric matching software component 330 executing on the smart card reader microprocessor 310 compares the particular fingerprint template to candidate fingerprint and transmits an indication of a result of the comparing to the mobile device 100.

Even though the memory card reader driver component 332 is provided with an ability to read the fingerprint templates 336 and extract and store the required fingerprint template from the fingerprint templates 336 contained in the response APDU, for security purposes, the memory card reader driver component 332 may remain unable to independently determine which fingerprint template is the required fingerprint template. The task of determining which fingerprint template is the required fingerprint template remains with the memory card driver 248 executed by the mobile device microprocessor 216.

While not intended to be limiting, the following assumptions with regards to the configurations of the mobile device 100 and the smart card reader 110 are made with respect to the description that follows: (a) the memory card driver 248 is executed on the mobile device 100; (b) each different type of memory card available for use as the memory card 334 uses an associated mobile device driver; (c) a collection of identification templates, such as biometric templates 336, is stored on the memory card 334, which is inserted into the storage component interface 322; (d) the identification information matching software, such as the biometric matching software component 330, used to match candidate identification information to one of the identification templates, is executed on the smart card reader 110 as part of the operating system 326; (e) the link between the mobile device 100 and the smart card reader 110 using the short-range communications subsystems 232, 320 provides limited bandwidth, making minimization of data transfer over this link desirable, in order to accelerate the biometric authentication process; and (f) most software for the pairing and authentication processes, with the exception of the biometric matching software component 330 and the memory card reader driver component 332, resides on the mobile device 100.

Figures 4A, 4B:
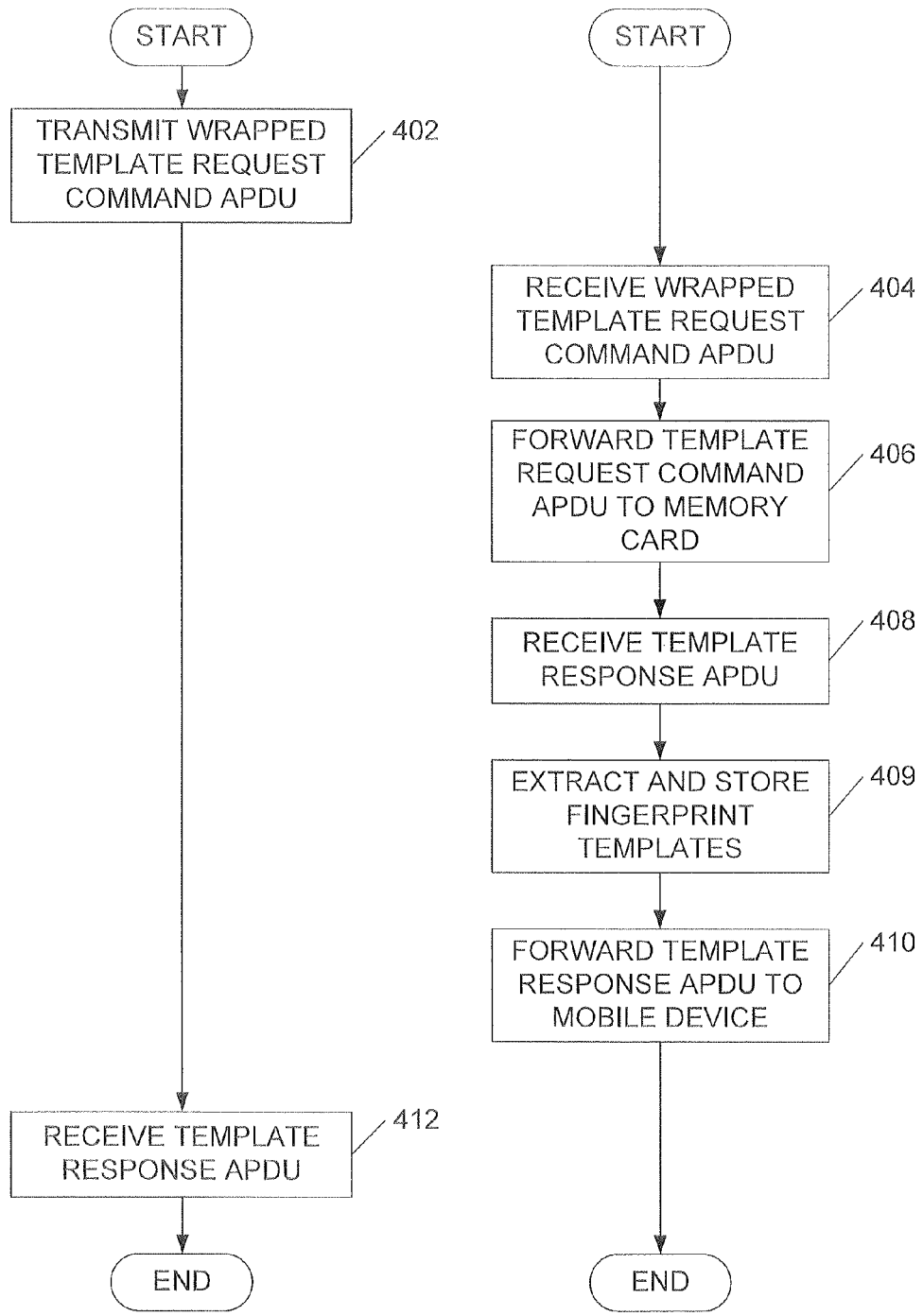
FIG. 4A illustrates steps, carried out by the mobile device of FIG. 2, of a method of exchanging messages allowing the mobile device to obtain a set of biometric templates stored on the memory card of FIG. 3 according to one embodiment.
FIG. 4B illustrates steps, carried out by the smart card reader of FIG. 3, corresponding to the steps of FIG. 4A.
Figure 5:
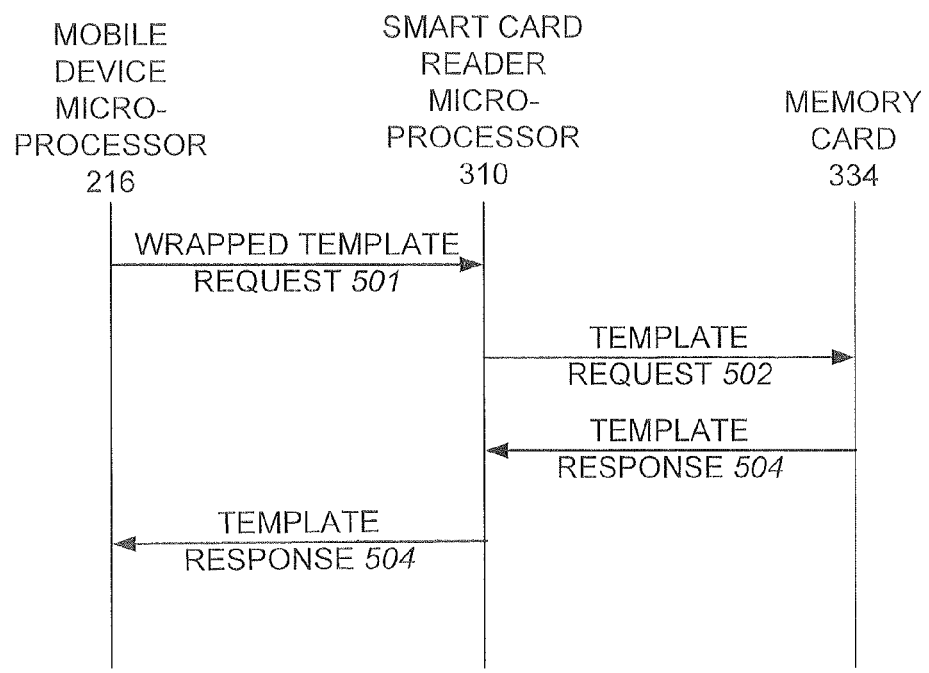
FIG. 5 is a flow diagram illustrating the exchange of messages between the mobile device of FIG. 2 and the smart card reader of FIG. 3 during the method of exchanging messages illustrated in FIGS. 4A and 4B.

FIG. 4A illustrates steps of an exemplary template acquisition method from the perspective of the mobile device 100. FIG. 4B illustrates steps of the exemplary template acquisition method from the perspective of the smart card reader 110. FIG. 5 is a flow diagram illustrating the exchange of messages between the mobile device 100 and the smart card reader 110 during the methods of FIGS. 4A and 4B.

Initially, the mobile device microprocessor 216 prepares a template request command APDU 502 for transmission to the smart card reader 110. The template request command APDU 502 indicates a requirement for the fingerprint templates 336 (FIG. 3) stored on the memory card 334. Notably, according to an extension to the memory card API that is used by the memory card driver 248 at the mobile device 100, the mobile device microprocessor 216 wraps the template request command APDU 502, using a novel PDU format to form a wrapped template request command APDU 501 that contains the template request command APDU 502 and also contains an indication that the response APDUs that are anticipated as a response to the template request command APDU 502 will contain fingerprint templates 336. The mobile device microprocessor 216 transmits (step 402, FIG. 4A) the wrapped template request command APDU 501 to the smart card reader 110.

The smart card reader microprocessor 310 receives the wrapped template request command APDU 501 (step 404, FIG. 4B) and records the indication that the response APDU will contain a fingerprint template 336. The smart card reader microprocessor 310 then forwards (step 406) the template request command APDU 502, extracted from the wrapped template request command APDU 501, to the memory card 334. The mobile device short-range communications subsystem 232, the smart card reader short-range communications subsystem 320 and the storage component interface 322 have been omitted from FIG. 5 for clarity.

Note that FIG. 5 only illustrates a single exemplary set of potentially many of APDUs (both command APDUs and response APDUs) that may be sent back and forth between the mobile device 100 and the smart card reader 110. There may be several fingerprint templates and each template may require several APDUs to transfer the entire fingerprint template (i.e., a fingerprint template may have to be transferred in sections).

Responsive to receiving the template request command APDU 502, the card driver and controller 338 of the memory card 334 formulates a template response APDU 504 to include a fingerprint template 336 (or a portion thereof) and transmits the template response APDU 504 to the smart card reader 110. When the template response APDU 504 has been received (step 408) by the smart card reader microprocessor 310, the smart card reader microprocessor 310 extracts (step 409) the fingerprint template 336 (or portion thereof) from the template response APDU 504 and stores the extracted information, for example, in the RAM/cache 316. The smart card reader microprocessor 310 then forwards (step 410) the template response APDU 504, which includes the fingerprint template 336, to the mobile device 100. The mobile device microprocessor 216 then receives (step 412, FIG. 4A) the template response APDU 504.

Figure 6:
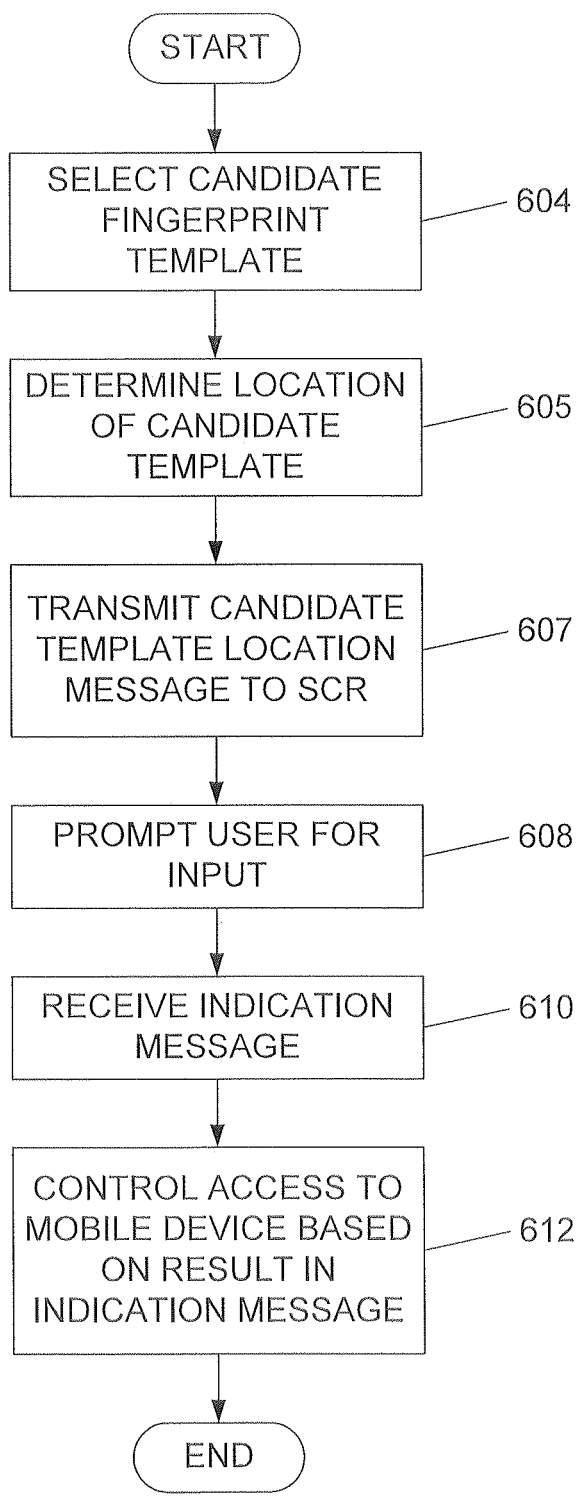
FIG. 6 illustrates steps, carried out by the mobile device of FIG. 2, of a method of exchanging messages related to authenticating a biometric candidate for allowing access to the mobile device according to one embodiment.
Figure 7:
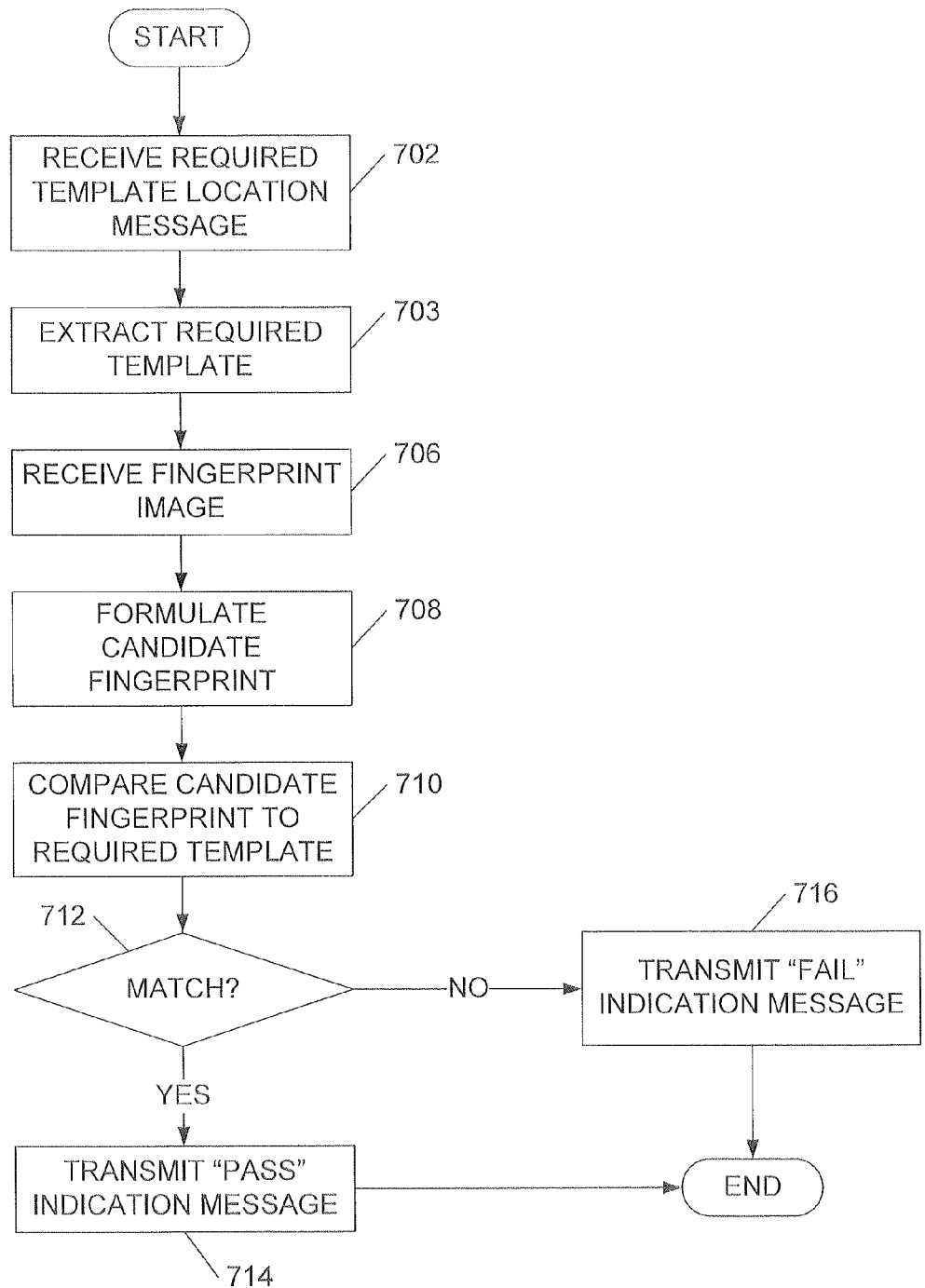
FIG. 7 illustrates steps, carried out by the smart card reader of FIG. 3, corresponding to the steps of FIG. 6.
Figure 8:
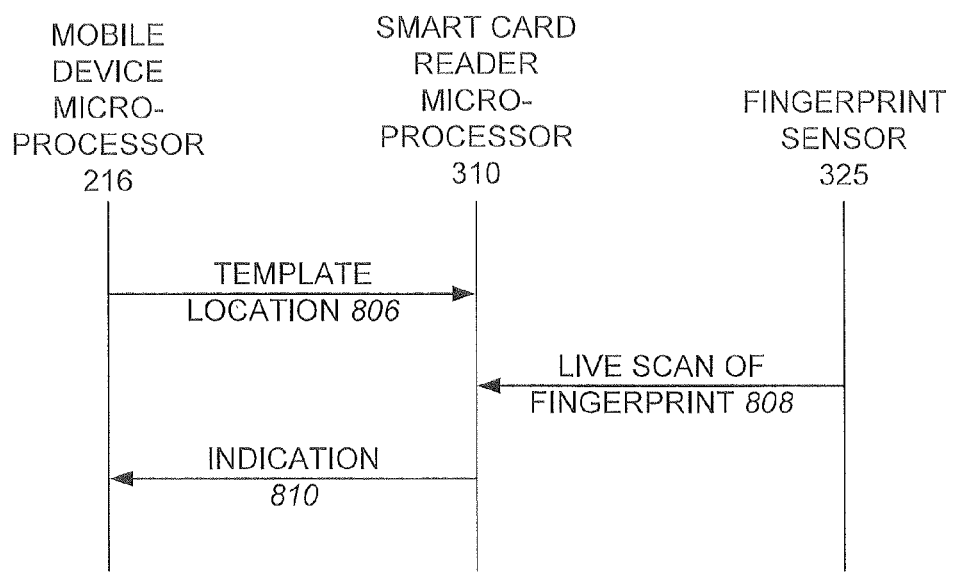
FIG. 8 is a flow diagram illustrating the exchange of messages between the mobile device of FIG. 2 and the smart card reader of FIG. 3 during the method of exchanging messages illustrated in FIGS. 6 and 7.

FIG. 6 illustrates steps of an exemplary fingerprint authentication method from the perspective of the mobile device 100. FIG. 7 illustrates steps of the exemplary fingerprint authentication method from the perspective of the smart card reader 110. FIG. 8 is a flow diagram illustrating the exchange of messages between the mobile device 100 and the smart card reader 110 during the execution of the methods of FIGS. 6 and 7.

To initiate the authentication of a candidate fingerprint, the mobile device microprocessor 216 selects (step 604, FIG. 6) a candidate fingerprint template from among the plurality of fingerprint templates and determines (step 605) the location of the candidate fingerprint template among the set of received fingerprint templates 336. With the location determined, the memory card driver 248 of the mobile device microprocessor 216 transmits (step 607) a template location message 806, indicating the location of the candidate fingerprint template among the set of received fingerprint templates 336, to the smart card reader 110. For example, the mobile device microprocessor 216 may select (step 604) a candidate fingerprint template associated with a right index finger from among the fingerprint templates available for each of ten fingers.

The location of the fingerprint template among the set of received fingerprint templates 336, as specified within the template location message 806, may include: an indication of the index of the required fingerprint template within the fingerprint templates 336; and an indication of the length of the required fingerprint template.

The mobile device microprocessor 216 may then prompt (step 608) the user for input. That is, the mobile device microprocessor 216 controls the presentation of an indication to the user, e.g., using the display sub-system 210 (FIG. 2), indicating that the user is to provide a finger to the fingerprint sensor 325.

In the meantime, the smart card reader microprocessor 310 receives (step 702, FIG. 7) the template location message 806. Once the smart card reader microprocessor 310 has the template location from the template location message 806, the microprocessor 310 extracts (step 703) the fingerprint template from the fingerprint templates 336 that were stored locally in step 409 (see FIG. 4B).

Responsive to the user having provided a finger to the fingerprint sensor 325, the fingerprint sensor 325 captures a live scan of the fingerprint and transmits the live scan 808 (FIG. 8) to the smart card reader 110. The smart card reader microprocessor 310 receives (step 706) the live scan 808 and formulates (step 708) a candidate fingerprint by digitally processing the live scan 808 to form a candidate fingerprint in keeping with the matching algorithm to be used.

The smart card reader microprocessor 310 then compares (step 710) the candidate fingerprint to the required fingerprint template by executing a predetermined matching algorithm. If the microprocessor 310 determines (step 712) that the result of the execution of the matching algorithm is a match, the microprocessor 310 transmits (step 714) a "pass" indication message 810 to the mobile device 100. If the microprocessor 310 determines (step 712) that the result of the execution of the matching algorithm is not a match, the microprocessor 310 transmits (step 716) a "fail" indication message 810 to the mobile device 100.

The mobile device microprocessor 216 receives (step 610) the indication message 810 that includes an indication of the result of the execution of the matching algorithm and, according to the indication of the result, controls access (step 612), i.e., allows or denies the user access, to the typical operation of the mobile device 100.

Communication between the mobile device 100 and the smart card reader 110 occurs by way of the mobile device short-range communications subsystem 232 (FIG. 2) and the smart card reader short-range communications subsystem 320 (FIG. 3). In one embodiment, the short-range communications subsystems 232, 320 use the Bluetooth™ protocol.

Each fingerprint template occupies a certain amount of memory; as an example, consider a fingerprint template that occupies about one kilobyte of memory. When the transmission of the fingerprint template occurs over a Bluetooth™ connection (e.g., at about 700 kbit/s) between the mobile device 100 and the smart card reader 110, the duration of the transmission is expected to be about 1.4 seconds.

In contrast, the template location message 806 merely provides a template location and not an entire fingerprint template. The template location message 806 is expected to occupy a significantly smaller amount of memory than the amount of memory that would be occupied by message carrying an entire fingerprint template as payload. Accordingly, the time required to transfer the template location message 806 from mobile device 100 to smart card reader 110 is significantly shorter than the time required to transfer a message carrying an entire fingerprint template from mobile device 100 to smart card reader 110.

Assuming that the mobile device microprocessor 216 has already requested and received the fingerprint templates 336, the use of the template location message 806 in place of the message carrying an entire fingerprint template is expected to improve the speed of authentication by at least one second per finger where the transmission of the fingerprint template occurs over a Bluetooth™ connection as described above. In an application that requires authentication of all ten fingers, the novel method proposed herein could improve the speed of authentication by more than ten seconds where a Bluetooth™ connection is used, for example.

While the method proposed herein is described in the context of the mobile device 100 and the smart card reader 110, the method, or substantially similar methods, could also be utilized on any suitable personal computing device communicating with any type of suitable peripheral device and the short-range communications subsystems employed between the two devices could be any known communications mechanism such as a USB connection, etc.

While biometric authentication has been presented above in isolation, it is known that biometric authentication may be part of a multi-factor authentication protocol that requires many independent ways to establish identity and privileges. Commonly, a two-factor authentication protocol is used.

In the context of the above-described example of single-factor (biometric) authentication, a multi-factor authentication protocol may involve a process for establishing that communication between the mobile device 100 and the smart card reader 110 should be allowed. Additionally, access to the memory card 334 may require the user to illustrate knowledge of a personal identification number (PIN) or other access code.

In a multi-factor authentication protocol, the following sequence of events may be required to gain access to the mobile device 100: (a) a user-specific mobile device password is entered, thereby authenticating the user to the mobile device 100; (b) a user-specific smart card reader password or PIN is entered to authenticate the user to the smart card reader 110; (c) the mobile device 100 is paired with the smart card reader 110, thereby satisfying the mobile device 100 that the user is in possession of the smart card reader 110; and (d) a biometric authentication process is completed, for example, as described above.

Step (c), the pairing process, may be required since the smart card reader 110 can be used to store sensitive information (e.g., security clearances, encryption keys, service books, personal data back-up, biometric templates, etc.). It is important, in at least some embodiments, that a secure method of authentication be available to prevent unauthorized access to the smart card reader 110 and/or the memory card 334. The pairing process is expected to be carried out under the control of the mobile device 100 and the smart card reader 110.

To initialize the pairing process, the push button 324 on the smart card reader 110 (see FIG. 3) may be actuated. Responsive to detecting a "button push" event, the smart card reader 110 displays (e.g., on the smart card reader display 312 shown in FIG. 3) a device address for the smart card reader 110. In one embodiment, the device address may be the unique 48-bit device address that is assigned to each Bluetooth™ device upon manufacture of the device. The pairing and security module 250 (FIG. 2) may then be executed by the microprocessor 216 of the mobile device 100. The user, having physical possession of the smart card reader 110, then reads the unique device address from the smart card reader display 312 and enters the unique device address into an element of a user interface provided on the mobile device 100 by the pairing and security module 250. In some embodiments, if the mobile device 100 had previously been paired with the smart card reader 110, the mobile device 100 may already have the address of the smart card reader 110 stored in memory (e.g., the flash memory 218). In such a case, the user may merely use the user interface provided on the mobile device 100 to select the address of the smart card reader 110 stored in memory. The mobile device microprocessor 216 then transmits a pairing request (e.g., using the mobile device short-range communications subsystem 232) to the smart card reader 110. After having displayed the device address, the smart card reader 110 awaits the pairing request from the mobile device microprocessor 216.

Successfully pairing the mobile device 100 to the smart card reader 110 does not necessarily grant the mobile device 100 full access to all data stored in the memory card 334 or the smart card reader flash memory 314. Further password entry may be required to access some or all of the data available to be read by the smart card reader 110. For example, contents of the memory card 334 or the flash memory 314 may be protected by passwords, thus requiring further verification for access to such content.

As will be clear to a person of ordinary skill in the art, the method of authenticating a candidate fingerprint (FIGS. 6 and 7) relies (a) on the smart card reader 110 having an ability to extract a required fingerprint template from a copy of the fingerprint templates 336 stored on the memory card 334 and (b) on the copy of the fingerprint templates 336 stored locally at the smart card reader 110 being identical to the copy of the fingerprint templates 336 stored on the mobile device 100. That is, the mobile device 100 need not necessarily obtain a copy of the fingerprint templates 336 from the smart card reader 110 in combination with the memory card 334.

The above-described embodiments of the present application are intended to be examples only. Alterations, modifications and variations may be effected to the particular embodiments by those skilled in the art without departing from the scope of the application, which is defined by the claims appended hereto. For example, in other embodiments, the identification information can be an image, such as a picture supplied by the user, and the authentication is performed by the identification matching software component comparing or analyzing the supplied image to stored image templates.

What is claimed is:

1. A method of facilitating, at a peripheral device, an efficient exchange of messages in a system for authenticating access to a base device, said authenticating based on a data set comprising a plurality of biometric templates, said method comprising:
receiving, from said base device, a wrapped template request command data unit, said wrapped template request command data unit including:
a template request command data unit for forwarding to a memory device physically connected to said peripheral device, said template request command data unit requesting transmission of said data set to said base device, and
an indication that a response message from said memory device will contain a biometric template;
extracting said template request command data unit from said wrapped template request command data unit;
recording said indication that said response message from said memory device will contain a biometric template;
forwarding said template request command data unit to said memory device;
receiving a response message from said memory device;
subsequent to having recorded said indication and received said response message:
extracting a copy of said data set received in said response message;
storing said copy of said data set;
forwarding said response message to said base device;
comparing, at said peripheral device responsive to said obtaining, said biometric template, extracted from said data set, to a biometric candidate obtained from a biometric input device integrated with said peripheral device; and
transmitting an indication of a result of said comparing to said base device so that, at the base device and based on the indication of the result, access to the base device may be controlled.

2. The method of claim 1 wherein said template request command data unit comprises a command application protocol data unit according to ISO 7816.

3. The method of claim 1 wherein said peripheral device comprises a smart card reader.

4. The method of claim 1 wherein said plurality of biometric templates comprise fingerprint templates.

5. The method of claim 1 wherein said receiving from said base device and said transmitting to said base device comprises employing a wireless communication channel.

6. The method of claim 5 wherein said wireless communication channel comprises a Bluetooth communications channel.

7. A peripheral device as part of a system for authenticating access to a base device, said authenticating based on a data set comprising a plurality of biometric templates, said peripheral device adapted to:
receive, from said base device, a wrapped template request command data unit, said wrapped template request command data unit including:
a template request command data unit for forwarding to a memory device physically connected to said peripheral device, said template request command data unit requesting transmission of said data set to said base device, and
an indication that a response message from said memory device will contain a biometric template;
extract said template request command data unit from said wrapped template request command data unit;
record said indication that said response message from said memory device will contain a biometric template;
forward said template request command data unit to said memory device;
receive a response message from said memory device;
according to said indication:
extract a copy of said data set received in said response message;
store said copy of said data set;
forward said response message to said base device;
compare, at said peripheral device responsive to said obtaining, said biometric template, extracted from said data set, to a biometric candidate obtained from a biometric input device integrated with said peripheral device; and
transmit, to said base device, an indication of a result of said comparing so that, at the base device and based on the indication of the result, access to the base device may be controlled.

8. The peripheral device of claim 7 wherein said template request command data unit comprises a command application protocol data unit according to ISO 7816.

9. The peripheral device of claim 7 wherein said peripheral device comprises a smart card reader.

10. The peripheral device of claim 7 wherein said plurality of biometric templates comprise fingerprint templates.

11. The peripheral device of claim 7 wherein said peripheral device is adapted to receive from said base device and transmit to said base device by employing a wireless communication channel.

12. The peripheral device of claim 11 wherein said wireless communication channel comprises a Bluetooth communications channel.

13. A non-transitory computer readable medium containing computer-executable instructions that, when performed by processor in a peripheral device, said peripheral device being part of a system for authenticating access to a base device, said authenticating based on a data set comprising a plurality of biometric templates, cause said processor to:
receive, from said base device, a wrapped template request command data unit, said wrapped template request command data unit including:
a template request command data unit for forwarding to a memory device physically connected to said peripheral device, said template request command data unit requesting transmission of said data set to said base device, and an indication that a response message from said memory device will contain a biometric template;

extract said template request command data unit from said wrapped template request command data unit;

record said indication that said response message from said memory device will contain a biometric template;

forward said template request command data unit to said memory device;

receive a response message from said memory device;

according to said indication:

extract a copy of said data set received in said response message;

store said copy of said data set;

forward said response message to said base device;

compare, at said peripheral device responsive to said obtaining, said biometric template, extracted from said data set, to a biometric candidate obtained from a biometric input device integrated with said peripheral device; and transmit, to said base device, an indication of a result of said comparing so that, at the base device and based on the indication of the result, access to the base device may be controlled.

14. The non-transitory computer readable medium of claim 13 wherein said template request command data unit comprises a command application protocol data unit according to ISO 7816.

15. The non-transitory computer readable medium of claim 13 wherein said peripheral device comprises a smart card reader.

16. The non-transitory computer readable medium of claim 13 wherein said plurality of biometric templates comprise fingerprint templates.

17. The non-transitory computer readable medium of claim 13 wherein said instructions cause said processor to receive from said base device and transmit to said base device by employing a wireless communication channel.

18. The non-transitory computer readable medium of claim 17 wherein said wireless communication channel comprises a Bluetooth communications channel.

* * * * *